US007512616B2

(12) United States Patent
Corcoran et al.

(10) Patent No.: US 7,512,616 B2
(45) Date of Patent: Mar. 31, 2009

(54) APPARATUS, SYSTEM, AND METHOD FOR COMMUNICATING A BINARY CODE IMAGE

(75) Inventors: Brian Jeffrey Corcoran, Oro Valley, AZ (US); Lourdes Magally Gee, Tucson, AZ (US); Matthew Joseph Kalos, Tucson, AZ (US); Ricardo Sedillos Padilla, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 10/718,420

(22) Filed: Nov. 20, 2003

(65) Prior Publication Data

US 2005/0114391 A1    May 26, 2005

(51) Int. Cl.
 *G06F 17/30* (2006.01)
(52) U.S. Cl. .................. 707/101; 707/10; 707/100; 717/136; 717/177; 717/164; 341/87; 341/88; 341/89; 341/95
(58) Field of Classification Search ................ 707/1–2, 707/6–7, 100–104.1, 200; 717/136, 177, 717/164; 715/523; 714/701–702, 751; 341/87–89, 341/94–95; 345/555, 559
See application file for complete search history.

(56) References Cited

U.S. PATENT DOCUMENTS

| | | | | |
|---|---|---|---|---|
| 5,216,613 A | * | 6/1993 | Head, III | 700/102 |
| 5,848,198 A | * | 12/1998 | Penn | 382/276 |
| 5,862,143 A | * | 1/1999 | Suh | 370/513 |
| 6,172,980 B1 | * | 1/2001 | Flanders et al. | 370/401 |
| 6,243,081 B1 | * | 6/2001 | Goris et al. | 345/555 |
| 6,282,642 B1 | * | 8/2001 | Cromer et al. | 713/2 |
| 6,408,326 B1 | * | 6/2002 | Larsson et al. | 709/201 |
| 6,438,664 B1 | * | 8/2002 | McGrath et al. | 711/154 |
| 6,467,021 B1 | * | 10/2002 | Sinclair | 711/113 |

(Continued)

FOREIGN PATENT DOCUMENTS

EP     0360241    *  3/1990    .................. 7/17

(Continued)

OTHER PUBLICATIONS

Tong WB et al. "data structure for segmenting binary image", proceedings TENCON'93,vol. 2 IEEE, 1993, pp. 1146-1149.*

(Continued)

*Primary Examiner*—Khanh B Pham
(74) *Attorney, Agent, or Firm*—Kunzler & McKenzie

(57) ABSTRACT

An apparatus, system, and method are disclosed for communicating binary data using a self-descriptive binary data structure. The binary data structure also may be referred to as a microcode reconstruct and boot (MRB) image. The binary data structure includes a plurality of data segments, a target data set, and a data structure descriptor. Each of the data segments has a data segment header and data field. The target data set is stored within the data field and may be an executable. The data structure descriptor is descriptive of the binary data structure and identifies the location of the target data set within the data field. The binary data structure is self-descriptive in that the location of an individual target data set may be identified by the data structure descriptor.

36 Claims, 7 Drawing Sheets

U.S. PATENT DOCUMENTS

| | | | |
|---|---|---|---|
| 6,499,137 B1* | 12/2002 | Hunt | 717/164 |
| 6,580,647 B1* | 6/2003 | Yokota et al. | 365/185.33 |
| 6,807,617 B2* | 10/2004 | McGrath | 711/208 |
| 6,839,825 B1* | 1/2005 | Brown | 711/202 |
| 7,047,283 B1* | 5/2006 | Kim | 709/220 |
| 7,155,709 B2* | 12/2006 | McGoogan et al. | 717/162 |
| 2003/0033280 A1* | 2/2003 | Van Den Hamer et al. | 707/1 |
| 2003/0051236 A1* | 3/2003 | Pace et al. | 717/177 |
| 2003/0120909 A1* | 6/2003 | Zimmer et al. | 713/2 |
| 2003/0229707 A1* | 12/2003 | Sharon et al. | 709/230 |
| 2004/0022444 A1* | 2/2004 | Rhoads | 382/232 |
| 2005/0114685 A1* | 5/2005 | Blinick et al. | 713/191 |
| 2006/0034189 A1* | 2/2006 | Chen et al. | 370/254 |

FOREIGN PATENT DOCUMENTS

| | | | | |
|---|---|---|---|---|
| WO | WO 90/06647 | * | 6/1990 | |
| WO | WO 02/29624 | * | 4/2002 | 17/30 |
| WO | WO2005055054 | * | 6/2005 | 9/445 |

OTHER PUBLICATIONS

Witold Litwin et al. "LH*RS: A highly available distributed data storage", proceedings of the 30th VLDB conference, 2004, pp. 1289-1292.*

Jean-Claude Wippler, "An overview of the MetaKit daa format", Equi4 Software, Dec. 1999, 7 pages.*

Eero Lassila, "A macro expansion approach to embedded processor code generation", 1996.*

System V application Binary interface-Draft-24,SCO, Chapter 5, program loading and dynamic linking, Apr. 2001.*

Anderson,A et al. "the binary compatibility standard", thirty-fourth IEEE computer society international conference: intellectual leverage, digest of papers, 1989, pp. 32-37.*

Gordon Doughman, software specialist, Reference guide for SRec-Cvt, An S-record formatting program for the M68HC12 Microcontroller family, Motorola semiconductor, Mar. 21, 2001 pp. 1-9.*

Cooper T et al. "The case for segments", fourth international workshop on object-orientation in oerating systems, 1995, pp. 94-102.*

D. M. Nagel and J. W. van den Berg., "Directorized Data Descriptor" IBM Technical Disclosure Bulletin, vol. 21, No. 7 (Dec. 1978), pp. 2653-2659. New York, New York.

Li Feng, Yang Zhen, "Design of Booting System Based on Flash," Journals of Nanjing University of Posts and Telecommunications, vol. 23, No. 2.

* cited by examiner

APPARATUS, SYSTEM, AND METHOD FOR COMMUNICATING A BINARY CODE IMAGE

BACKGROUND OF THE INVENTION

1. Field of the Invention

This invention relates to data transmission and more particularly relates to an apparatus, system, and method for communicating binary data using a self-descriptive binary data structure.

2. Description of the Related Art

One of the primary methods of transferring data between a host and a storage system is to use a data structure called an s-record. The s-record format was first created by Motorola™ and has become an industry-standard for transmitting files from a source 102 to a target 104. Other developers have created derivatives and supplementary enhancements to the s-record over time, but the s-record data structure has generally remained the same in most regards. Although the s-record data structure may be used to transmit files that contain data that will ultimately be stored in binary format, the s-record data structure itself is in ASCII format, typically using ASCII and hex characters.

An s-record may be described as a single line in an s-record image or file. Each s-record within the file includes metadata and data. The metadata, for example, includes a memory address in which the data is to be stored. Unfortunately, the total length of each s-record is relatively short, limited to no more than 78 bytes. Consequently, an s-record image containing many s-records must include a significant amount of metadata. This creates various concerns for transferring an s-record image as well as processing and storing the data.

Of great concern is the overhead required to transmit an s-record image from one device to another. The amount of bandwidth and the time required to transmit an s-record is substantial due to the large amount of metadata that also must be transmitted with the data. Furthermore, the ASCII s-record needs to be converted to binary, at some point, prior to storing the data in the memory. A significant disadvantage related to converting large quantities of data from ASCII to binary is that substantial memory is necessary to concurrently accommodate both the ASCII and the binary formats as the conversion is taking place.

One beneficial use of the s-record data structure is recognized in applications that require frequent error checking during transmission of the data. By transmitting and checking individual s-records, transmission errors may be recognized quickly, and the data may be reprocessed. Although the s-record format may include one record to indicate the quantity of records in a file, the s-record format does not provide a means to check the integrity of the entire image or file. In contrast, there is much less need in many data transmission applications to check very small blocks of data. For example, many data transmission applications, such as storage system applications, realize significant benefits by transmitting large blocks of data and checking the entire image or file, rather than individual records. Frequent error checking is not required in many storage system applications because the transmission distance is relatively short and the opportunity for data transmission losses is relatively low.

A further shortcoming of the s-record data structure is that it does not provide any means for identifying individual code segments within the s-record or the s-record image. The s-record simply provides a small set of data and the memory address in which that data is to be stored. The data within a single s-record is contiguous, but the data in consecutive s-records is not necessarily contiguous. Without some type of index, table of contents, or process for identifying individual code segments in an s-record or s-record image, it is not possible to extract a desired set of data from within the s-record or s-record image.

It is important to note that some forms of binary images, as compared to ASCII images, do exist. Some of these binary image formats include the executable and linking format (ELF) and the common object file format (COFF). However, these formats are configured to include only a single executable and do not identify individual code segments within a file.

Consequently, a need exists for an apparatus, system, and method that overcome the foregoing limitations that are inherent in the conventional s-record data structure and regime. Beneficially, such an apparatus, system, and method would overcome the detrimental impacts of the large size of the s-record image, the complexity of processing the data, the inability to perform error checking on an entire image, and the inability to identify or extract an individual code segment.

BRIEF SUMMARY OF THE INVENTION

The present invention has been developed in response to the present state of the art, and in particular, in response to the problems and needs in the art that have not yet been fully solved by currently available code images and data structures. Accordingly, the present invention has been developed to provide an apparatus, system, and method for communicating binary data using a self-descriptive binary data structure that overcomes many or all of the above-discussed shortcomings in the art.

The apparatus for communicating binary data using a self-descriptive binary data structure is provided with a logic unit containing a plurality of modules configured to functionally execute the necessary steps of communicating binary data using a self-descriptive binary data structure. These modules in the described embodiments include a plurality of data segments, a target data set, and a data structure descriptor. The data structure descriptor indicates the location of the target data set within one of the plurality of data segments. In this way, the binary data structure is self descriptive.

The data structure descriptor may be, in one embodiment, a customizable directory descriptor configured to provide a table of contents, index, or directory of the data stored in each of the data fields. In particular, the data structure descriptor describes the location of an executable. In a further embodiment, the data structure descriptor may comprise a name, version, type, or other indicator that is descriptive of the binary data image. Additionally, the target data set may be a code image, an executable, or another runtime text or data set. In a certain embodiment, the binary data image also may include one or more alignment segments.

A system of the present invention is also presented for communicating binary data using a self-descriptive binary data structure. The system, in one embodiment, includes a source device connected via a communication channel to a target device. In one embodiment, the system may be a storage system or a storage area network, or portion thereof. The source transmits a self-descriptive binary data structure to the target.

In a further embodiment, the source device may be configured to generate the binary data structure, for instance, from data or a non-binary data structure. The target device may be further configured to process an executable, such as a bootstrap module, that is within the binary data image.

A method of the present invention is also presented for communicating binary data using a self-descriptive binary data structure. The method, in the disclosed embodiments, substantially includes the steps necessary to carry out the functions presented above with respect to the operation of the described apparatus and system. Specifically, one embodiment of the described method includes generating a plurality of data segments, attaching a data structure descriptor to the combined data segments, identifying a target data set, and storing the location of the target data set in the data structure descriptor.

One embodiment of the present invention beneficially decreases the time and complexity associated with communicating a binary data structure between a source and a client. In another embodiment, the present invention advantageously reduces the size and processing complexity of data structures that may be used in conjunction with data transfers to a storage system. Additional benefit also may be derived from the self-descriptive nature of the present binary data structure. These and other benefits are described in more detail in the description that follows.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
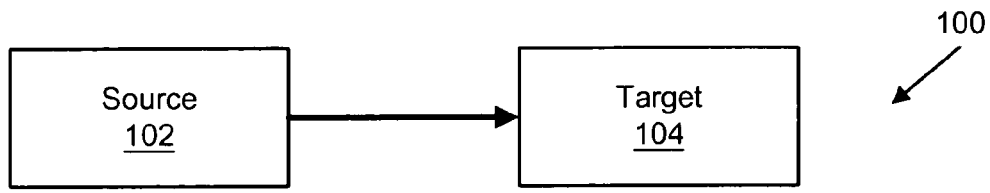
FIG. 1 is a schematic block diagram illustrating one embodiment of a communication system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a communication system 100 that may employ the present invention. The illustrated communication system 100 includes a source 102 and a target 104. The source 102 is configured to send data to the target 104. The data may be sent to the target 104 for any number of reasons, including data storage, command executions, and access requests. In one embodiment, the source 102 sends a code image to the target 104.

A code image is a fundamental set of computer instructions, similar to an operating system, which define how a computer system or subsystem will function. A code image also may be called microcode, embedded code, or the like. The code image typically includes assembly code instructions or raw machine language binary code instructions that are optimized for a particular microprocessor and/or set of hardware.

Periodically, the code image on a computer or hardware device must be updated to provide improved functionality, resolve programming bugs, and/or support new hardware. It is desirable that an old code image be updated with a new code image with minimal interruption of the computer system. The code image update should require minimal time, comprise operations of minimal complexity, and provide minimal delay in resuming regular operations once the update completes.

In one embodiment, a code image update may be performed by a section of an old code image known as the bootstrap code. The bootstrap code is executed in response to an interrupt signaling a code image update operation. In an alternate embodiment, the code image update may be performed at least in part by a section of a new code image. The bootstrap code may copy the new code image directly from a source media device, such as a disk drive, into a memory device connected to the hardware. Alternately, the bootstrap code may locate and process the new code image. The copy operation may partially or wholly overwrite the old code image with the new code image. This process is known as a code overlay. In one embodiment, the target 104 may receive the new code image from the source 102.

Figure 2:
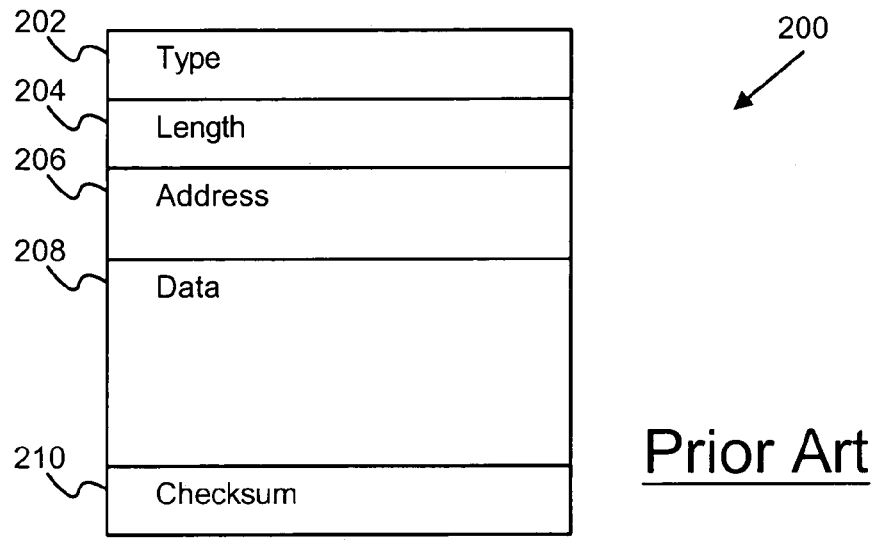
FIG. 2 is a schematic block diagram illustrating one embodiment of a conventional s-record data structure.

FIG. 2 depicts one embodiment of a conventional s-record data structure 200 that may be used to communicate data between the source 102 and the target 104. The s-record format was first created by Motorola™ and has become an industry-standard for transmitting files from a source 102 to a target 104 in a data storage environment. Although the s-record data structure 200 may be created from and used to transmit binary files, the conventional s-record data structure 200 is in ASCII format, typically using ASCII and hex characters.

The illustrated s-record data structure 200 includes a type field 202, a length field 204, an address field 206, a data field 208, and a checksum field 210. Each s-record 200 is not more than 78 bytes in length. The type field 202 stores a type indicator that indicates the type of record that the s-record data structure 200 is. Table 1-1 outlines the various type indicators that currently exist. The length field 204 stores a length indicator that indicates the length of the composite address field 206, data field 208, and checksum field 210. The length indicator includes two hex characters and indicates the length in bytes, rather than characters.

The address field 206 stores an address indicator that indicates the memory address where the data in the data field 208 is to be stored. The address indicator may be four, six, or eight characters, corresponding to 16-, 24-, and 32-bit addresses, respectively. The data in the data field 208 is represented by hex characters. The checksum field 210 stores the one's compliment of the 8-bit checksum.

| Type Indicator | Type of S-Record |
|---|---|
| S0 | Optional Starting Record |
| S1 | Data Record, 16-bit address |
| S2 | Data Record, 24-bit address |
| S3 | Data Record, 32-bit address |
| S4 | Symbol Record (used by LSI ™) |
| S5 | Data Record Quantity |
| S6 | (not used) |
| S7 | Ending Record (for S3 Record) |
| S8 | Ending Record (for S2 Record) |
| S9 | Ending Record (for S1 Record) |

Figure 3:
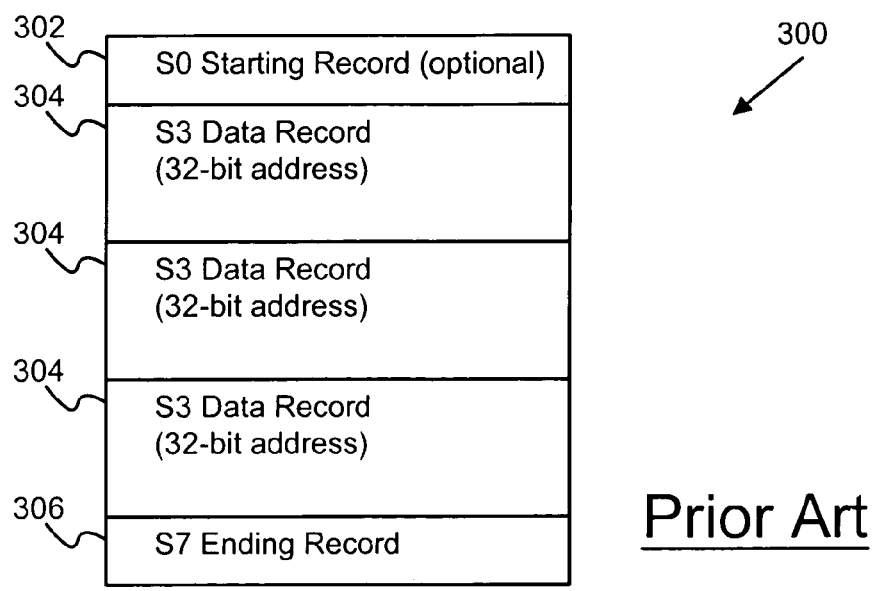
FIG. 3 is a schematic block diagram illustrating one embodiment of a conventional s-record image.

FIG. 3 depicts one embodiment of a conventional s-record image 300 that includes several distinct s-record data structures 200. The illustrated s-record image 300 includes an S0 starting s-record 302, multiple S3 data s-records 304, and an S7 ending s-record 306.

Figure 4:
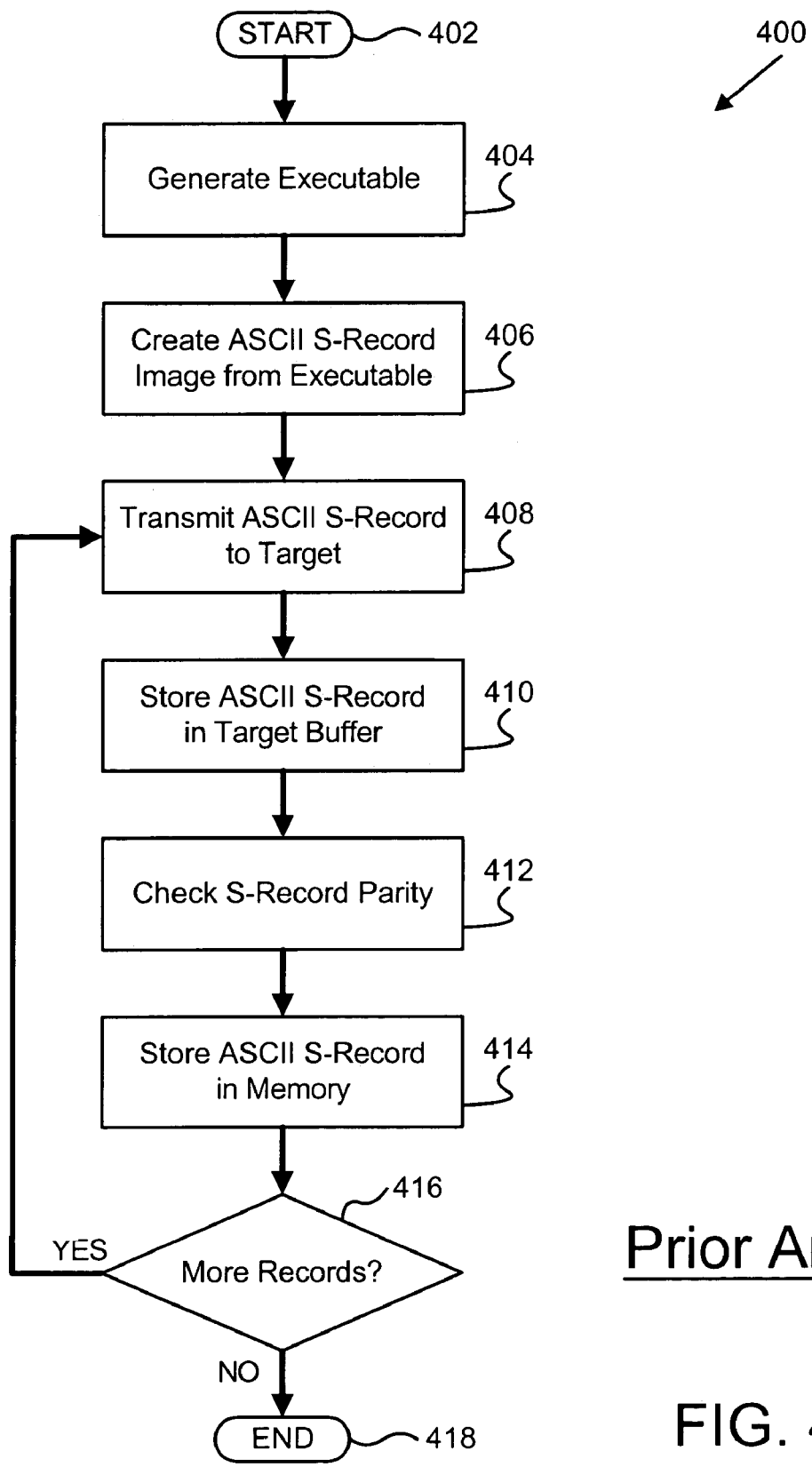
FIG. 4 is a schematic flow chart diagram illustrating one embodiment of a conventional s-record communication method.

FIG. 4 depicts a conventional s-record communication method 400 that may be employed by a source 102 and a target 104. The illustrated s-record communication method 400 begins 402 by generating 404 an executable and creating 406 an ASCII s-record image 300 from that executable. In a further embodiment, the s-record communication method 400 may access a previously generated s-record image 300. The source 102 then transmits 408 each s-record 200 within the s-record image 300.

The target 104, upon receiving an s-record 200 from the source 102, may store 410 the s-record 200 in a memory buffer in the target 104 and check 412 the parity of the s-record 200 to verify that the s-record 200 was properly transmitted 408 and received. The target 104 then stores 414 the s-record 200 in the local memory on the target 104. Storing 414 the s-record in the local memory is discussed further with reference to FIG. 5.

The illustrated s-record communication method 400 then determines 418 if additional s-records 200 need to be processed and, if so, returns to transmit 408 a subsequent ASCII s-record 200 from the source 102 to the target 104. After all of the available s-records 200 have been processed, the depicted s-record communication method 400 then ends 418.

Figure 5:
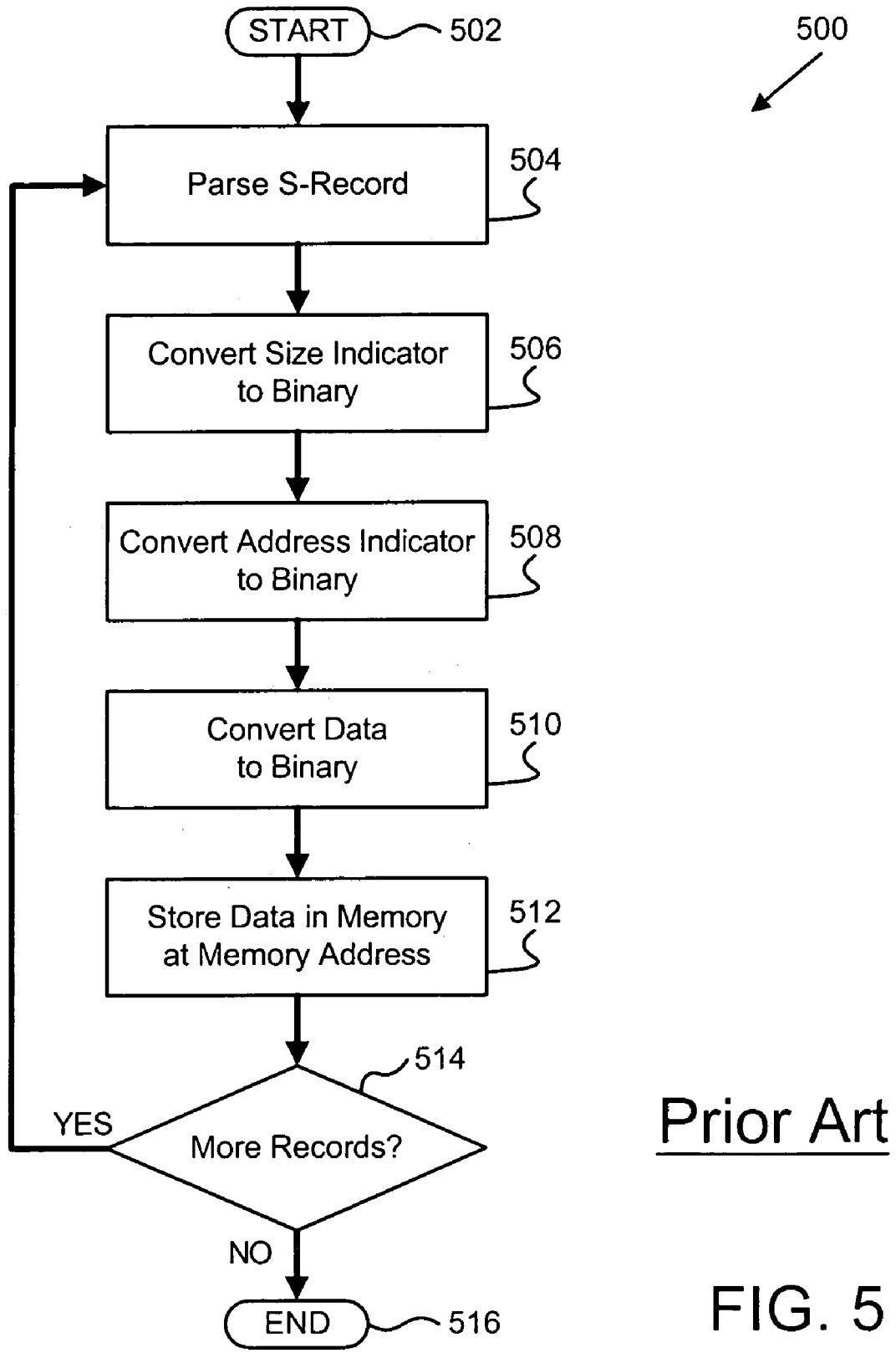
FIG. 5 is a schematic flow chart diagram illustrating one embodiment of a conventional s-record storage method.

FIG. 5 depicts a conventional s-record storage method 500 that may be employed by the target 104. The conventional s-record storage method 500 is given by way of example of the s-record storage step 414 of the s-record communication method 400 of FIG. 4. The illustrated s-record storage method 500 begins 502 by parsing 504 an individual s-record 200 into its several segments, or fields. The target 104 then converts 506 the length indicator from a hex character to a binary representation. The target 104 also converts 508 the address to a binary representation and converts 510 the data from a hex representation to a binary representation.

The target 104 then stores 512 the data in binary format in the memory location identified by the address indicator in the address field 206. The s-record storage method 500 may proceed to determine 514 if additional s-records 200 need to be processed and, if so, returns to parse 504 a subsequent s-record 200. The depicted s-record storage method 500 ends 520 after all of the s-records 200 have been processed.

Figure 6:
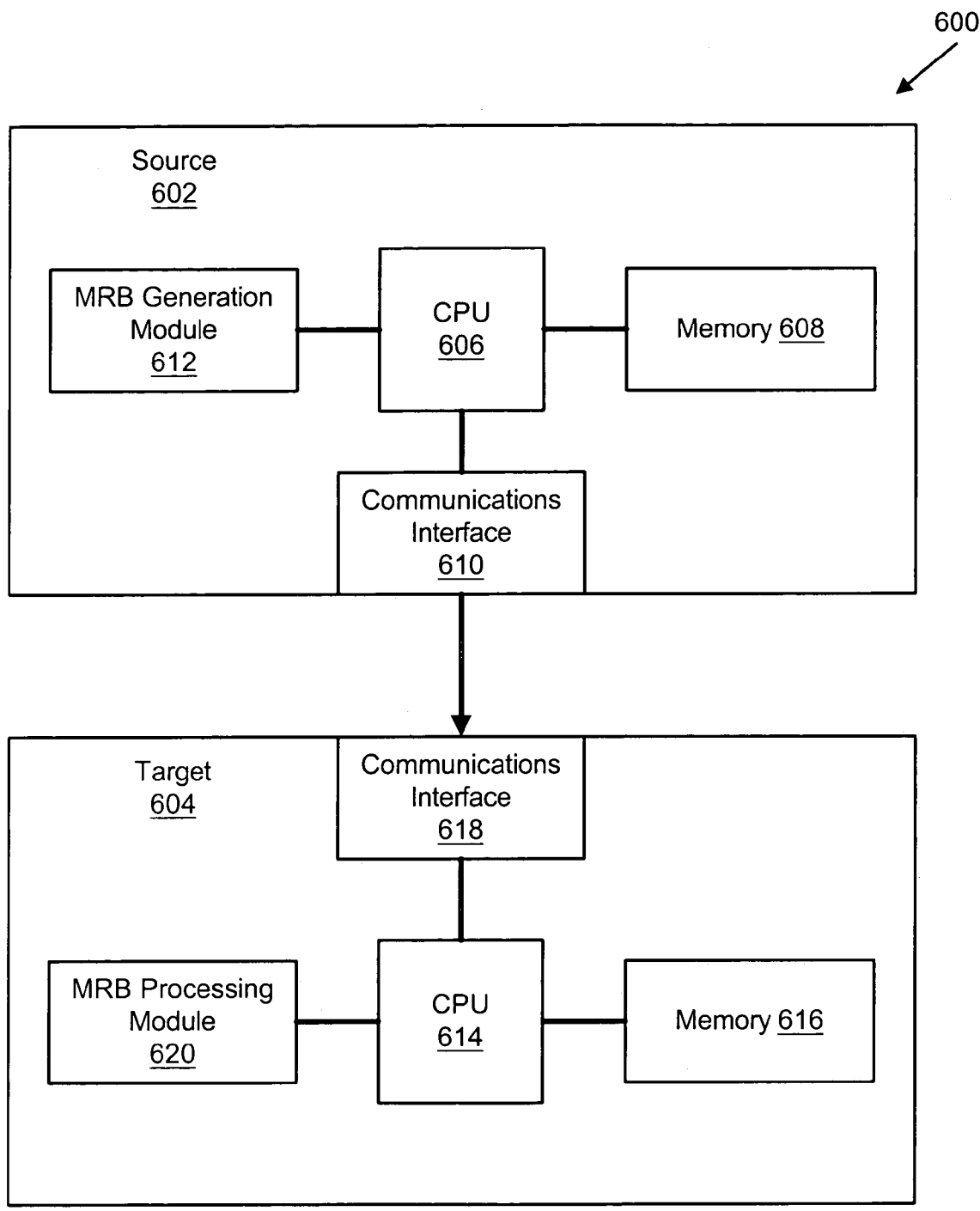
FIG. 6 is a schematic block diagram illustrating another embodiment of a communication system in accordance with the present invention.

FIG. 6 depicts one embodiment of a communication system 600 that is given by way of example of the communication system 100 shown in FIG. 1. The illustrated communication system 600 includes a source 602 and a target 604. The source 602 comprises a processor (CPU) 606, an electronic memory device 608, a source communications interface 610, and a MRB generation module 612. The target 604 comprises a processor (CPU) 614, an electronic memory device 616, a target communications interface 618, and a MRB processing module 620.

The CPUs 606, 614 are configured, in one embodiment, to process operational commands within the source 602 and target 604, respectively. The electronic memory devices 608, 616 are configured, in one embodiment, to store data and metadata that may be related to the operation of the source 602 and target 604, respectively. In one embodiment, the electronic memory device may comprise a computer readable storage medium. The MRB generation module 612 is configured, in one embodiment, to generate a microcode reconstruct and boot (MRB) data structure. The MRB structure will be discussed further with reference to FIGS. 7-10. The MRB processing module 620 is configured, in one embodiment, to process a MRB data structure stored on the target 604. In one embodiment, processing a MRB data structure may include simply storing the data in the memory 616.

The source communications interface 610 is configured, in one embodiment, to send data from the source 602 to the target 604. The target communications interface 618 is configured, in one embodiment, to receive the data sent by the source 602. In a certain embodiment, the source 602 may comprise a storage system and the source communications interface 610 may comprise a host adapter. Additionally, the target 604 may be a host and the target communications adapter 618 may be a host bus adapter (HBA).

Figure 7:
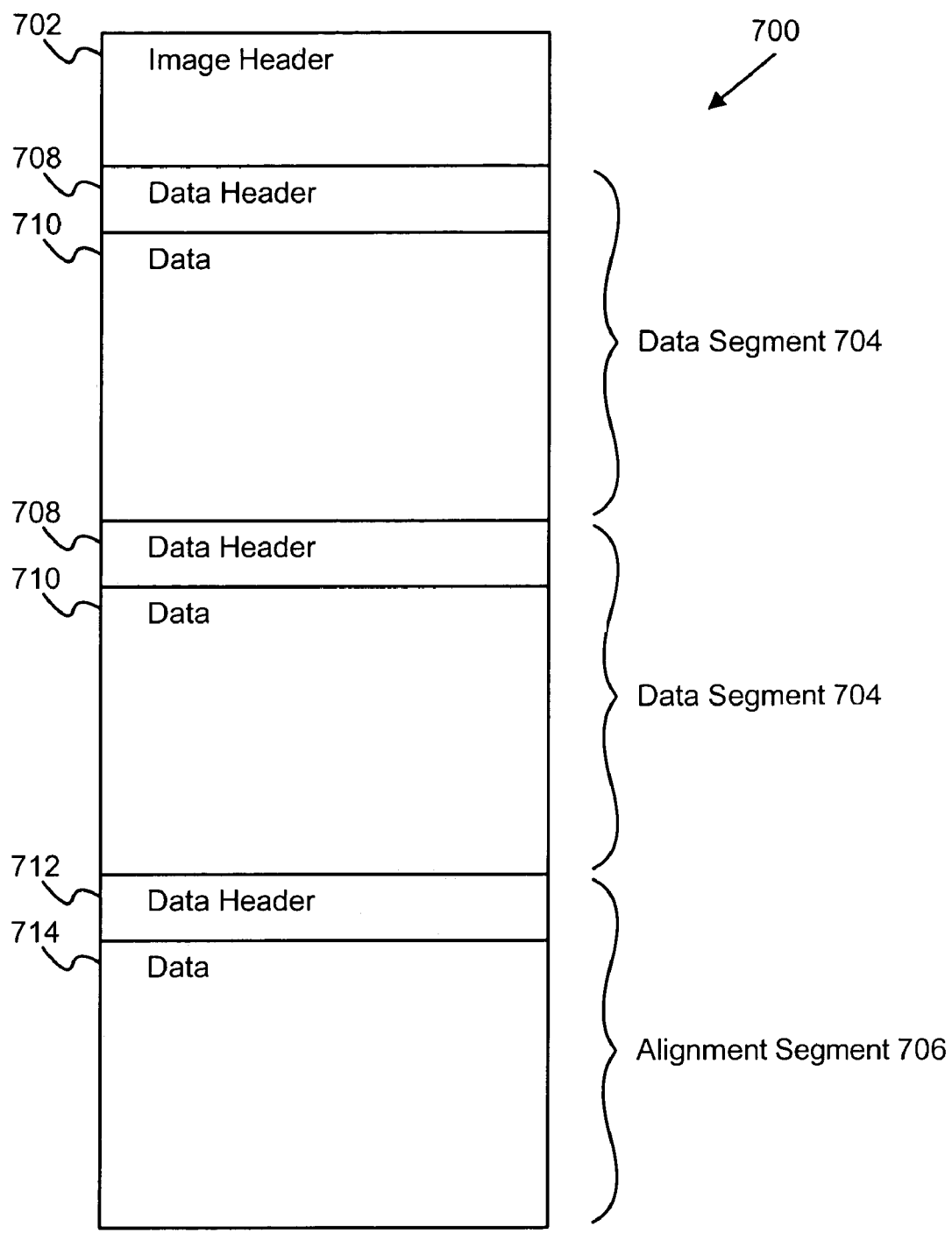
FIG. 7 is a schematic block diagram illustrating one embodiment of a MRB image in accordance with the present invention.

FIG. 7 depicts one embodiment of a microcode reconstruct and boot (MRB) image 700. The MRB image 700 is a binary data structure that may be employed to transfer binary data from the source 602 to the target 604. The illustrated MRB image 700 includes an image header 702 and one or more data segments 704. The MRB image 700 may further include an alignment segment 706.

The image header 702 is configured to store metadata describing the MRB image 700 and its contents. The image header 702 will be discussed further with reference to FIG. 8. Although referred to as a "header" within this description, the image header 702 may be located at the end of the MRB image 700, between data segments 704, or distributed in multiple portions throughout the MRB image 700. Preferably, however, the image header 702 is located at the beginning of the MRB image 700.

Each data segment 704, in one embodiment, includes a data header 708 and data 710. The data header 708 is configured to store metadata regarding the data 710 and will be discussed further with reference to FIG. 9. The data 710 stored within a data segment 704, in one embodiment, may include runtime text, multiple executables, reference data, and so forth.

The alignment segment 706 also may include a data header 712 and data 714. In one embodiment, the alignment segment 706 is provided in the MRB image 700 solely to adjust the length of the MRB image 700 in order to facilitate error detection, error correction, and similar integrity checking. In a further embodiment of the MRB image 700, the alignment section 706 may be located at the beginning of the MRB image 700 or between data segments 704. Alternately, multiple alignment segments 706 may be included in the MRB image 700 and located jointly or in a distributed manner.

Figure 8:
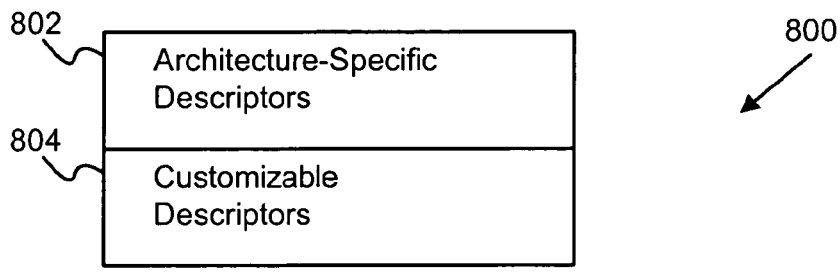
FIG. 8 is a schematic block diagram illustrating one embodiment of a MRB image header in accordance with the present invention.

FIG. 8 depicts one embodiment of a MRB image header 800 given by way of example of the MRB image header 702 of the MRB image 700 in FIG. 7. The illustrated MRB image header 800 includes one or more architecture-specific descriptors 802 and one or more customizable descriptors 804.

The architecture-specific descriptors 802 are stored in descriptor fields that have fixed byte allocations. In other words, the location and length of each architecture-specific descriptor field may be fixed within the MRB image 700. In one embodiment, for example, the first 128 bytes and last 128 bytes of a 512-byte MRB image header 800 maybe invariant with respect to their location, size, and content definition. The contents of these fields may change, but the field definition is invariant. For example, eight bytes may be reserved in every MRB image header 800 to store a version indicator, regardless of which version is actually indicated.

The customizable descriptors 804 of the MRB image header 800 may be variable in size, definition, and content depending on the application in which the MRB image 700 is implemented. The customizable descriptors 804, for example, may contain error check information, application-specific variables, and other variable data. In one embodiment, the customizable descriptors 804 include a table of contents or index that indicates the location of one or more executables stored within the data segments 704 of the MRB image 700.

Figure 9:
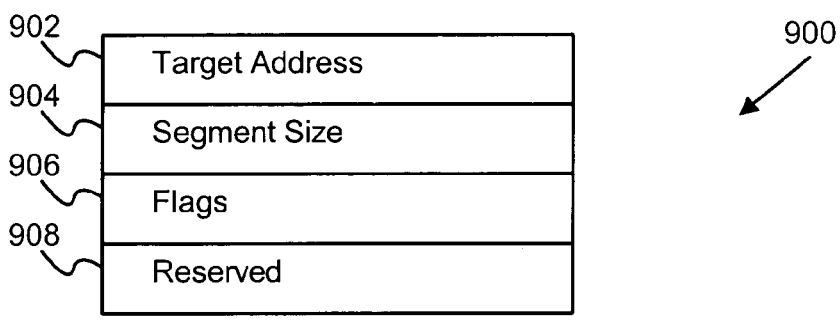
FIG. 9 is a schematic block diagram illustrating one embodiment of a data segment header in accordance with the present invention.

FIG. 9 depicts one embodiment of a data segment header 900 given by way of example of the data header 708 of the data segment 704 in FIG. 7. The illustrated data segment header 900 includes a target address 902, a segment size indicator 904, and one or more flags 906. The data segment header also may include a reserved field 908 that serves as a placeholder for additional metadata fields for future implementations of the MRB image 700.

The target address 902 indicates the memory location in which the corresponding data 710 in the data segment 704 is to be stored on the target 604. The segment size indicator 904 indicates the size of the subsequent set of data 710. There is no inherent limit on the size of the set of data 710 in the data segment 704. The flags 906, in one embodiment, may be configured to indicate characteristics or a certain status associated with the data 710 in the data segment 704. In a further embodiment, one or more flags 906 may be used to indicate the presence of a particular subset of data, such as an executable bootstrap module, within the data 710 in the data segment 704.

Figure 10:
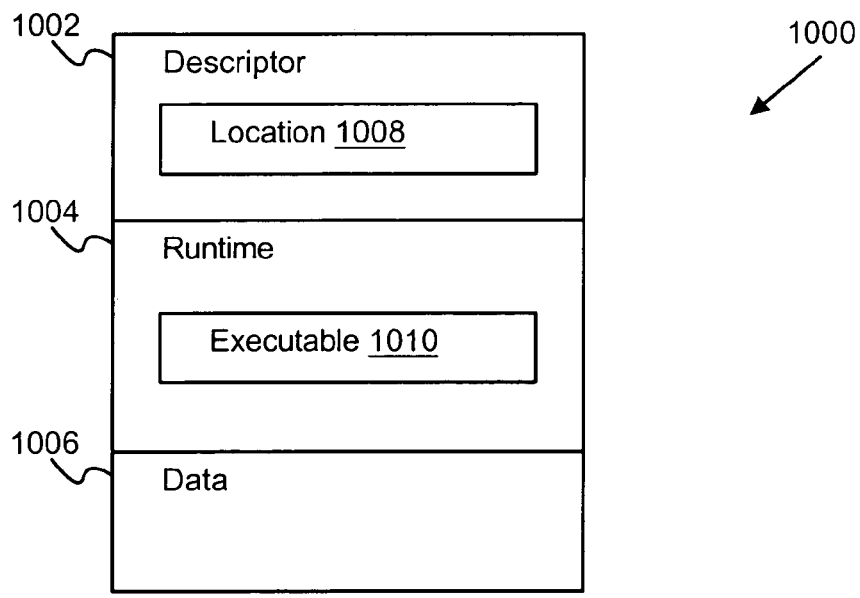
FIG. 10 is a schematic block diagram logically illustrating one embodiment of a MRB image in accordance with the present invention.

FIG. 10 depicts another embodiment of a MRB image 1000. The illustrated MRB image 1000 shows one example of a logical organization of the MRB image 700 of FIG. 7. The illustrated MRB image 1000 includes a descriptor field 1002, a runtime field 1004, and a data field 1006. The descriptor field 1002 is configured to store one or more descriptors, such as a location indicator 1008, that describe the MRB image 1000 and its contents. The runtime field 1004 is configured to store one or more runtime texts, such as a bootstrap executable 1010. The data field 1006 is configured to store other data. In one embodiment, the descriptor field 1002 stores a table of contents or index that indicates the location 1008 of one or more executables 1010 stored within the runtime field 1004 of the MRB image 1000. In this way, the MRB image 1000 is self-descriptive.

Figure 11:
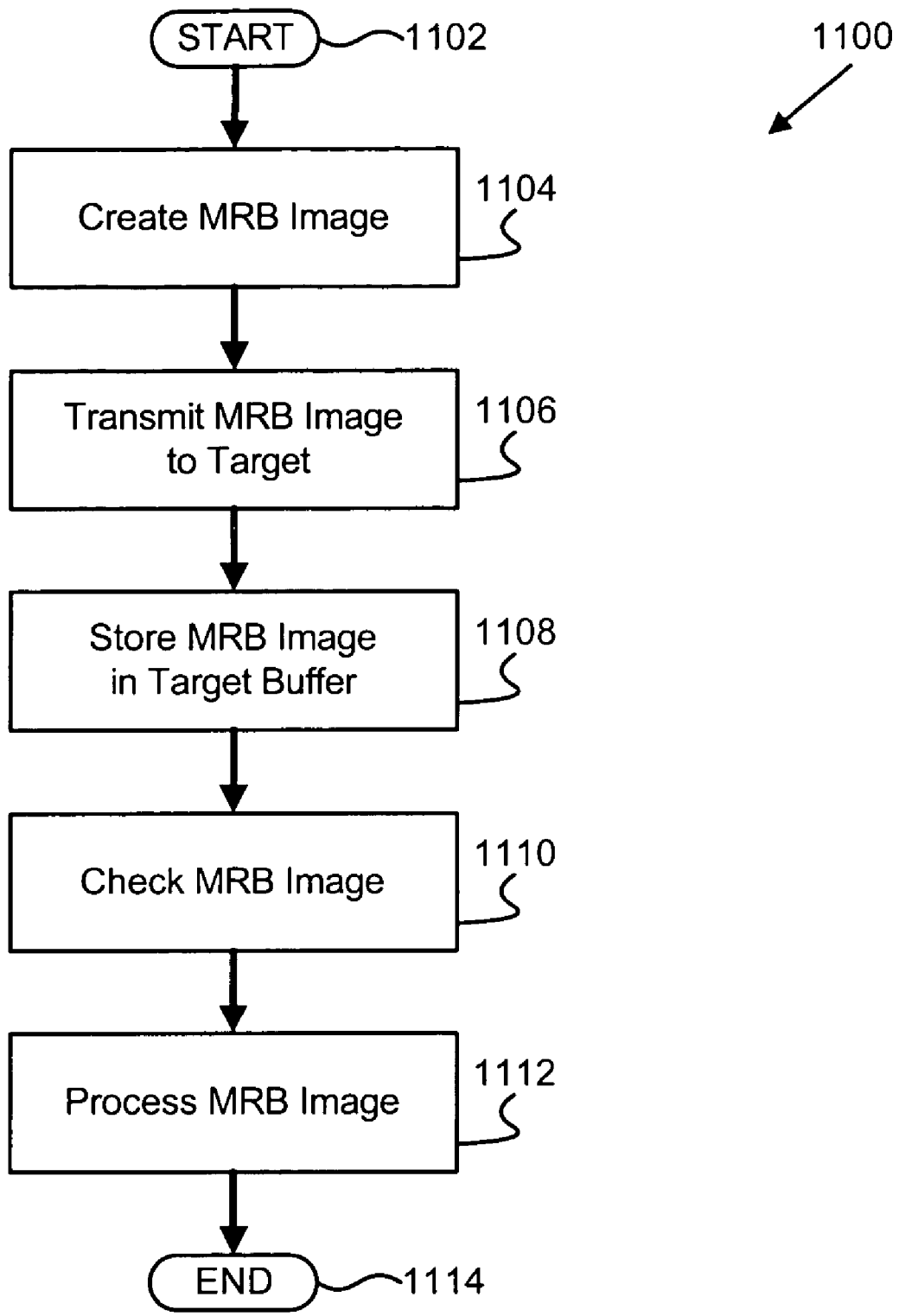
FIG. 11 is a schematic flow chart diagram illustrating one embodiment of a MRB communication method in accordance with the present invention.

FIG. 11 depicts one embodiment of a MRB communication method 1100 that may be employed by the communication system 600 shown in FIG. 6. The illustrated MRB communication method 1100 begins 1102 by creating 1104 the MRB image 700. The source 602 may employ the MRB generation module 612 in order to create the MRB image 700. In one embodiment, the MRB image 700 may be created by converting a conventional s-record image 300 to a MRB image 700. Such a conversion may facilitate interfacing with conventional hardware that uses s-records 200 and s-record images 300. In an alternate embodiment, the MRB image 700 may be created directly or by converting from another file format. In a further embodiment, the MRB image 700 may be created previously.

The source 602 then transmits 1106 the MRB image 700 to the target 604. Because the MRB image 700 is a true binary image, no conversion from ASCII characters is required prior to transmission. Upon receiving the MRB image 700, the target 604 may store 1108 the MRB image 700 in the local memory device 606, for example, in a buffer. While in the buffer, the target 602 may check 1110 the MRB image 700 using error detection, error correction, and other integrity checking techniques. In one embodiment, the MRB processing module 620 checks 1110 the MRB image 700. The MRB processing module 620 then may proceed to process 1112 the MRB image 700 according to the requesting application. The depicted MRB processing method 1100 then ends 1114.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium storing a self-descriptive binary data structure executable on a computer processor for communicating binary data, the computer readable storage medium comprising:
the self-descriptive binary data structure configured to communicate data between a source device and a target device distinct from the source device, and comprising
an image header comprising 512 bytes with a first 128 bytes and a last 128 bytes that are location, size, and content definition invariant, the first 128 and last 128 storing architecture-specific descriptors and an eight byte version indicator;
a plurality of data segments, each of the plurality of data segments comprising a segment header and a data field, the segment header descriptive of the corresponding data segment;
a target data set within the data field; and
a data structure descriptor descriptive of the self-descriptive binary data structure, the data structure descriptor identifying the location of the target data set within the data field.

2. The computer readable storage medium of claim 1, further comprising a customizable directory descriptor, the customizable directory descriptor configured to provide a directory of the data stored in each of the data fields within the self-descriptive binary data structure.

3. The computer readable storage medium of claim 2, wherein the target data set comprises a bootstrap executable, the bootstrap executable configured to reference the customizable directory descriptor and to identify a location of a second target data set within the self-descriptive binary data structure using the customizable directory descriptor.

4. The computer readable storage medium of claim 3, wherein the bootstrap executable is further configured to access the second target data set within the self-descriptive binary data structure.

5. The computer readable storage medium of claim 1, further comprising a data structure version descriptor configured to indicate a version of the self-descriptive binary data structure.

6. The computer readable storage medium of claim 1, further comprising a data structure name descriptor configured to indicate a name of the self-descriptive binary data structure.

7. The computer readable storage medium of claim 1, further comprising a data structure type descriptor configured to indicate a type of the self-descriptive binary data structure.

8. The computer readable storage medium of claim 1, further comprising a data structure count descriptor configured to indicate a number of the plurality of data segments within the self-descriptive binary data structure.

9. The computer readable storage medium of claim 1, wherein the target data set is an executable.

10. The computer readable storage medium of claim 1, wherein the target data set is a code image.

11. The computer readable storage medium of claim 1, wherein one of the plurality of data segments is an alignment data segment configured to align the size of the self-descriptive binary data structure for at least one of error detection and correction.

12. The computer readable storage medium of claim 1, wherein the data segment header comprises a flag field configured to store a flag, the flag descriptive of the data stored in the data field.

13. A system for communicating binary data using a self-descriptive binary data structure capable of being stored in a computer readable storage medium, the system comprising:
a communications channel;
a source communication device connected to the communications channel and configured to transmit a self-descriptive binary data structure;
a target communication device connected to the source communications device via the communications channel, the target communication device distinct from the source communication device and configured to receive the self-descriptive binary data structure from the source communication device:
wherein the self-descriptive binary data structure comprises:
an image header comprising 512 bytes with a first 128 bytes and a last 128 bytes that are location, size, and content definition invariant, the first 128 and last 128 storing architecture-specific descriptors and an eight byte version indicator;
a plurality of data segments, each of the plurality of data segments comprising a segment header and a data field, the segment header descriptive of the corresponding data segment;
a target data set within the data field;
a data structure descriptor descriptive of the self-descriptive binary data structure, the data structure descriptor configured to identify the location of the target data set within the data field; and
wherein the target communication device is configured to process an executable, the executable stored in the self-descriptive binary data structure.

14. The system of claim 13, wherein the source communication device is further configured to generate the self-descriptive binary data structure.

15. The system of claim 14, wherein the source communication device is further configured to generate the self-descriptive binary data structure from a non-binary data structure.

16. The system of claim 13, wherein the executable comprises a bootstrap executable, the bootstrap executable configured to access a code image within the self-descriptive binary data structure.

17. A method for communicating binary data using a self-descriptive binary data structure, the method comprising:
generating a self-descriptive binary data structure comprising
an image header comprising 512 bytes with a first 128 bytes and a last 128 bytes that are location, size, and content definition invariant, the first 128 and last 128 storing architecture-specific descriptors and an eight byte version indicator;
a plurality of data segments, each of the plurality of data segments comprising a segment header and a data field, the segment header descriptive of the corresponding data segment;
a target data set within the data field; and
a data structure descriptor to the plurality of data segments, the data structure descriptor descriptive of the self-descriptive binary data structure and identifying the location of the target data set within the data field;
communicating the self-descriptive binary data structure with a communications interface from a source device to a target device distinct from the source device; and
processing the target data set.

18. The method of claim 17, further comprising storing a customizable directory descriptor and providing a directory of the data stored in each of the data fields within the self-descriptive binary data structure.

19. The method of claim 18, further comprising storing a bootstrap executable and identifying a location of a second target data set within the self-descriptive binary data structure using the customizable directory descriptor.

20. The method of claim 19, further comprising accessing the second target data set within the self-descriptive binary data structure.

21. The method of claim 17, wherein generating the plurality of data segments comprises generating an alignment data segment and aligning the size of the self-descriptive binary data structure for at least one of error detection and correction.

22. The method of claim 17, wherein generating a plurality of data segments comprises generating the plurality of data segments from a non-binary data structure.

23. The method of claim 17, wherein processing an executable comprises processing a bootstrap executable, the bootstrap executable configured to access a code image within the self-descriptive binary data structure.

24. A method for communicating binary data, the method comprising:
providing a self-descriptive binary data structure at a source communications device, the self-descriptive binary data structure having an image header comprising 512 bytes with a first 128 bytes and a last 128 bytes that are location, size, and content definition invariant, the first 128 and last 128 storing architecture-specific descriptors and an eight byte version indicator and a customizable directory descriptor, the customizable descriptor configured to provide a directory of the data stored in each of the data fields within the self-descriptive binary data structure;
communicating the self-descriptive binary data structure between a source communication device and a target communication device via a communications network, the target device distinct from the source device;
processing the self-descriptive binary data structure at the target communications device; and
executing a bootstrap executable, the bootstrap executable configured to reference the customizable directory descriptor and to identify a location of a second target data set within the self-descriptive binary data structure using the customizable directory descriptor.

25. The method of claim 24, wherein providing the self-descriptive binary data structure comprises converting a non-binary data structure into the self-descriptive binary data structure.

26. A computer readable storage medium comprising computer readable code for execution on a computer processor to carry out a method for communicating binary data using a self-descriptive binary data structure, the method comprising:
generating an image header comprising 512 bytes with a first 128 bytes and a last 128 bytes that are location, size, and content definition invariant, the first 128 and last 128 storing architecture-specific descriptors and an eight byte version indicator;
generating a plurality of data segments, each of the plurality of data segments comprising a segment header and a data field, the segment header descriptive of the corresponding data segment;
attaching a data structure descriptor to the image header and the plurality of data segments, the data structure descriptor descriptive of the self-descriptive binary data structure, the self-descriptive binary data structure comprising the plurality of data segments and the data structure descriptor;
identifying a target data set within the data field;
storing a location of the target data set in the data structure descriptor; and
sending the self-descriptive binary data structure from a source device to a target device distinct from the source device.

27. The computer readable storage medium of claim 26, wherein the method further comprises storing a customizable directory descriptor and providing a directory of the data stored in each of the data fields within the self-descriptive binary data structure.

28. The computer readable storage medium of claim 27, wherein the method further comprises storing a bootstrap executable and identifying a location of a second target data set within the self-descriptive binary data structure using the customizable directory descriptor.

29. The computer readable storage medium of claim 28, wherein the method further comprises accessing the second target data set within the self-descriptive binary data structure.

30. The computer readable storage medium of claim 26, wherein the method further comprises wherein the data structure descriptor comprises at least one of data structure version descriptor, a data structure name descriptor, a data structure type descriptor, and a data structure count descriptor.

31. The computer readable storage medium of claim 26, wherein the method further comprises generating an alignment data segment and aligning the size of the self-descriptive binary data structure for at least one of error detection and correction.

32. The computer readable storage medium of claim 26, wherein the method further comprises storing a flag in the data segment header, the flag descriptive of the data stored in the data field.

33. The computer readable storage medium of claim 26, wherein the method further comprises generating the plurality of data segments from a non-binary data structure.

34. The computer readable storage medium of claim 26, wherein the method further comprises processing an executable that is stored in the self-descriptive binary data structure.

35. The computer readable storage medium of claim 26, wherein the method further comprises processing a bootstrap executable, the bootstrap executable configured to access a code image within the self-descriptive binary data structure.

36. An apparatus for communicating binary data using a self-descriptive binary data structure, the apparatus comprising:
- means for generating an image header comprising 512 bytes with a first 128 bytes and a last 128 bytes that are location, size, and content definition invariant, the first 128 and last 128 storing architecture-specific descriptors and an eight byte version indicator;
- means for generating a plurality of data segments, each of the plurality of data segments comprising a segment header and a data field, the segment header descriptive of the corresponding data segment;
- means for attaching a data structure descriptor to the image header and the plurality of data segments, the data structure descriptor descriptive of the self-descriptive binary data structure, the self-descriptive binary data structure comprising the plurality of data segments and the data structure descriptor;
- means for identifying a target data set within the data field;
- means for storing a location of the target data set in the data structure descriptor on a storage device; and
- means for sending the self-descriptive binary data structure from a source device to a target device distinct from the source device.

* * * * *